US006304940B1

United States Patent
Beardsley

(10) Patent No.: US 6,304,940 B1
(45) Date of Patent: Oct. 16, 2001

(54) SHARED DIRECT ACCESS STORAGE SYSTEM FOR MVS AND FBA PROCESSORS

(75) Inventor: Brent Cameron Beardsley, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/313,190

(22) Filed: May 18, 1999

Related U.S. Application Data

(63) Continuation-in-part of application No. 08/911,008, filed on Aug. 14, 1997, now abandoned.

(51) Int. Cl.$^7$ .................................................. G06F 12/00
(52) U.S. Cl. .......................... 711/112; 711/154; 711/170; 711/202
(58) Field of Search .................................. 711/112, 113, 711/114, 154, 100, 147, 170, 111, 3, 4, 202, 208, 217; 703/23, 24

(56) References Cited

U.S. PATENT DOCUMENTS

| | | | |
|---|---|---|---|
| 5,206,939 | 4/1993 | Yanai et al. ............................... | 711/4 |
| 5,257,362 | 10/1993 | Menon ...................................... | 711/114 |
| 5,283,884 | 2/1994 | Menon et al. ......................... | 711/113 |
| 5,301,304 | 4/1994 | Menon ...................................... | 703/24 |
| 5,388,013 * | 2/1995 | Nakamura .............................. | 360/48 |
| 5,459,853 | 10/1995 | Best et al. .............................. | 711/114 |
| 5,463,754 | 10/1995 | Beausoliel et al. .................... | 709/213 |
| 5,535,372 | 7/1996 | Benhase et al. ........................ | 703/23 |
| 5,564,019 | 10/1996 | Menon ...................................... | 709/215 |
| 5,581,743 * | 12/1996 | Burton et al. ........................... | 703/26 |
| 5,636,359 * | 6/1997 | Beardsley et al. ..................... | 711/122 |
| 5,664,144 * | 9/1997 | Yanai et al. ............................. | 711/113 |
| 5,724,542 * | 3/1998 | Taroda et al. ........................... | 711/113 |
| 5,860,088 * | 1/1999 | Benhase et al. ........................ | 711/112 |
| 5,862,363 * | 1/1999 | Taroda et al. ........................... | 703/25 |
| 5,920,893 * | 7/1999 | Nakayama et al. ................... | 711/147 |
| 6,009,498 * | 12/1999 | Kumasawa et al. .................. | 711/113 |
| 6,041,386 * | 3/2000 | Bello ........................................ | 711/4 |
| 6,112,277 * | 8/2000 | Bui et al. ............................... | 711/114 |
| 6,115,797 * | 9/2000 | Kanda et al. .......................... | 711/147 |

OTHER PUBLICATIONS

Clio, D. Blokkum, et al., Proceedings–Share Europe Anniversary Meeting, The Hague, Oct. 25–28, 1993, pp. 385–393.
Moving Data Between MVS, CMS and Unix Problems and Solutions, N. Maclaren, Share Europe Spring Conference, Brussels, Apr. 1994.

* cited by examiner

Primary Examiner—Matthew Kim
Assistant Examiner—Pierre-Michel Bataille
(74) Attorney, Agent, or Firm—John H. Holcombe; Robert M. Sullivan

(57) ABSTRACT

Disclosed are a shared direct access data storage system and sharing method for use with both an MVS data processing system and a data processing system employing FBA data, for storing data set records received from the MVS data processing system. A CKD controller receives the data set from the MVS data processing system. An FBA controller and disk data storage provides direct access to FBA records by the FBA data processing system. A mapping element maps the data set records from the MVS data processing system into FBA data records with fixed blocks. The received data set records are uniformly sized, and the mapping element converts the uniformly sized records into smaller sized fixed blocks, with the size of the uniformly sized records being an even multiple of the smaller sized fixed blocks. A map translates the data of the first record of the data set into the block id of the first block and continues to map the data set into a continuing sequence of fixed blocks. The records are thus mapped into FBA data records with fixed blocks as stored in the CKD disk data storage for direct access by the FBA data processing system, preferably as though they were a removable media.

6 Claims, 2 Drawing Sheets

SHARED DIRECT ACCESS STORAGE SYSTEM FOR MVS AND FBA PROCESSORS

CROSS-REFERENCE TO RELATED APPLICATION

This application is a continuation-in-part of U.S. application Ser. No. 08/911,008, entitled "SHARED DIRECT ACCESS STORAGE SYSTEM FOR MVS AND FBA PROCESSORS", which was filed in the U.S. Patent & Trademark office on Aug. 14, 1997 now abandoned.

TECHNICAL FIELD

This invention relates to the sharing of data sets between incompatible data processor systems. More particularly, the invention relates to a direct access storage system for accomplishing the sharing of data sets between two incompatible data processor systems.

BACKGROUND OF THE INVENTION

The difficulty of making Multiple Virtual Storage (MVS) files available to other systems is well known in the art. There are two aspects to making count, key and data (CKD) format files from a MVS available to a system which employs Fixed Block Architecture files: getting the data from one system to another in a form allowing sharing, and recoding it from one system's conventions to the other.

The files may be transferred, rather than shared, by using a simple text transfer, for example, by using an internet binary image mode, which is stream binary. Each internet connection sets up a separate connection and this is extremely inefficient and error prone. The form of transfer does not accomplish sharing of the data sets.

A method for transferring large data sets to another system is to write a tape and move the tape to the other system for reading, using one tape drive that is compatible with the MVS system and another tape drive that can read the same tape, but which is compatible with the other system. The data sets on each system after the transfer are totally separate and are not shared.

Utilities may be able to edit the data to convert text files, but are handled very inefficiently and transferred as a single file, and the transfer may not be error free.

Data mining is the ability to analyze a data file to interpret the file and ascertain information that is not apparent from a direct reading of the file. Examples include analyzing credit card data to ascertain the most likely group of persons who spend money more than a particular amount by credit card a month based on deposit and age, and to then select a more detailed group who have deposits, for example, between $3000 and $4000 and are in their 40's.

Another example is to ascertain unusual credit card activity and thereby identify possible credit card fraud.

In order to perform an accurate analysis, error free data is required.

In order to provide an effective analysis to, for example, identify a compromised credit card promptly, the access to the data set must be prompt.

Lastly, the data set to be analyzed may be changing rapidly so that it would be advantageous to provide continuing updates to the file as it is being analyzed.

Most credit card systems that would be analyzed are MVS systems. Most data mining applications are done by data processors running UNIX or AIX which employ FBA data, which data is incompatible with the CKD data of the MVS systems. The typical data set to be analyzed is in the range of 10's or 100's of gigabytes, which would require many hours of transmission time between systems using communication techniques.

Several techniques have been developed for emulating CKD on FBA but typically are usable for only small data sets or a limited number of records, and/or do not allow access by an FBA device, and therefore do not allow sharing of the data. Examples are U.S. Pat. No. 5,206,939 to Yanai et al. which discloses a compression technique for representing the COUNT field of every record in a cascading arrangement, U.S. Pat. No. 5,301,304 to Menon which discloses an emulation program which completely emulates CKD data stored on FBA devices while still retaining the same byte displacements of the CKD data by elimination of padding, intra-record gaps, etc., U.S. Pat. No. 5,283,884 to Menon et al. which stores a table entry in non-volatile memory for each record, and U.S. Pat. No. 5,535,372 to Benhase et al. which provides a track format descriptor in non-volatile storage for each track and describes whether the track comprises "well behaved" formatted data which is simple to search or is not "well behaved" such that the entire track must be loaded into cache.

It may be desirable to transfer the results of the data mining back to the originating data processing system to identify the specific accounts meeting the criteria of the analysis so that specific mailings may be conducted or phone calls placed, etc. Thus, a user requirement may be that access to the data set must be maintained by the originating system for proper coordination.

SUMMARY OF THE INVENTION

An object of the present invention is to provide a data storage system and method which allow data sharing on a high speed direct access basis between an MVS system and a data processing system employing FBA data. Hereinafter, a data processing system employing CKD data is referred to either as an MVS data processing system, or a CKD data processing system.

Disclosed are a shared direct access storage system and sharing method for use with both an MVS data processing system and a data processing system employing FBA data, for storing data set records received from the MVS data processing system. The MVS data processing system may extract the data set from an on line data base. A CKD control element creates an MVS Volume Table of Contents (VTOC) for the data set from the MVS data processing system and stores the data set in CKD data storage. An FBA controller and disk data storage provides for direct access to FBA data by the FBA data processing system. A mapping element, which may be a program, logic, or processor, maps the data set records from the MVS data processing system into shadow volume data records with fixed blocks. The received data set records are uniformly sized, and the mapping element converts the uniformly sized records into smaller sized fixed blocks, with the size of the uniformly sized records being an even multiple of the smaller sized fixed blocks. A mapping algorithm translates the CKD volume id, track id and record number for the first record of the data set as identified in the VTOC, of the shadow volume into the starting offset FBA volume id for the first block and the id's for the continuing sequence of fixed blocks. The data fields of the shadow volume records are mapped into FBA data records of fixed blocks, with each FBA data record arranged in a linear sequence of fixed blocks, as stored in the CKD disk data storage for direct access by the FBA controller for the data processor employing FBA data.

The VTOC and the address of the sequence of fixed blocks may be established by the shared data storage system, or a series of extents may be defined for the MVS host and utilized by the host to establish the VTOC, and the mapping algorithm establishes the logical FBA addresses.

The data set remains a CKD shadow volume data set, under the control of the CKD control element and of the MVS host, while being shared by the FBA controller. The MVS data processing system may thus provide updates to the data set.

The FBA mapping volume is identified to the FBA controller and its host as either a "raw disk", or, preferably, as a "removable media".

For a fuller understanding of the present invention, reference should be made to the following detailed description taken in conjunction with the accompanying drawings.

DETAILED DESCRIPTION OF THE INVENTION

Figure 1:
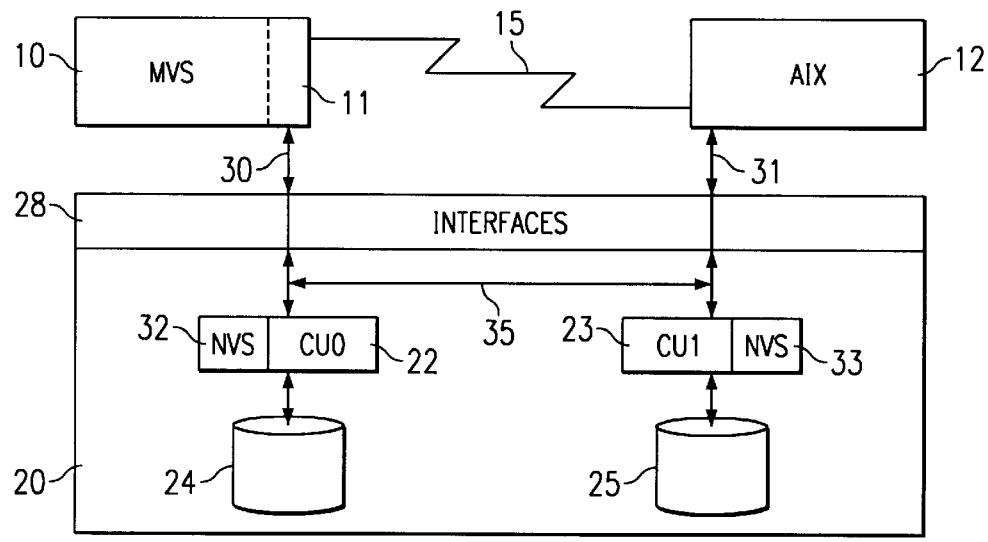
FIG. 1 is a diagrammatic representation of two incompatible data processing systems and a data storage subsystem of the present invention.

Referring to FIG. 1, a "mainframe" MVS host data processing system 10 is illustrated, which may comprise a data processing system such as the IBM System 390, or similar system. The data processing system may comprise one or a plurality of data processors operating as a single data processing system. The data processing system 10 may operate as a server for a large number of terminals or subprocessors, and which generates an on line data base or data set 11.

When stored on disk, the data set 11 is typically formatted in CKD format for disk storage.

A second data processing system 12 may be provided which employs data stored on disk in an FBA format, and which is utilized to analyze the data set 11 of data processing system 10. When utilized by data processing system 10, the data set is an analysis data base, and the data processing system 10 may look for patterns in accordance with an analysis program.

Disk drives typically store data on tracks, which are circular paths on the surfaces of disks on which information is recorded and from which recorded information is read. An MVS data processing system typically stores the data on disk in a COUNT, KEY, and DATA (CKD) format on the disk drives. An "open systems" data processing system, such as an IBM AIX data processing system, typically stores the data on disk in a series of fixed blocks, called fixed block architecture (FBA). For a detailed explanation of CKD architecture, see for example, Marilyn Boyl, Introduction to IBM Direct Access Storage Devices, Science Research Associates Inc., 1981. In Chapter 4, both the CKD format and the FBA format are described.

Briefly, the CKD format enables efficient usage of disk space for large records by dividing the disk track in accordance with record size, whereas the FBA format is simpler to access using a set of identically sized addressable areas (termed blocks), each of which can store up to some fixed amount of data, such as 512 bytes, 1024 bytes, etc. For most purposes, the MVS CKD data sets cannot be accessed by data processors using the FBA format, due to their incompatibility.

Because of the incompatible formats, a typical way to give an FBA data processor access to MVS data was by connecting the two data processing systems with a communication link 15, which has an interface with each of the data processing systems. Such communication links are typically very slow, operating at up to about 1/10th the speed of the disk data storage system associated with each of the processors. Additionally, communication links 15 are very error prone, including data loss and communication link breakdowns. The MVS data processing system must conduct disk I/O to develop the communication, and the FBA data processing system must conduct disk I/O to receive the communication.

The data set must then be converted to the FBA format and stored on a disk data storage facility of the FBA-based data processing system to conduct the analysis.

Figure 2:
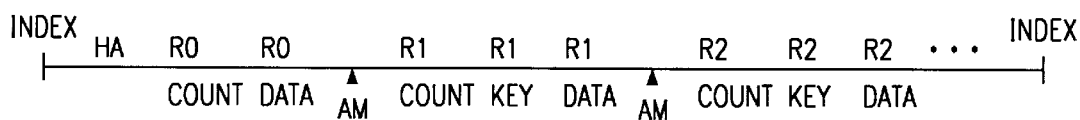
FIG. 2 is a representation of the CKD Data Format.

FIG. 2 illustrates a typical CKD track of a plurality of records. The CKD format typically contains a definition of how data is structured in the records contained on the track. A record is a set of one or more related data items grouped together for processing, such that the group may be treated as a unit. Disk drives utilizing the CKD format have an address mark as on each track that signifies the beginning of a record on the track. After the address mark, is a three-part record beginning with the COUNT field which serves as the record ID and also indicates the lengths of the optional KEY field and the DATA field, both of which will follow. There is also normally one Home Address (HA) that defines the physical location of the track and the condition of the track. The HA typically contains the physical track address, a track condition flag, a cylinder number (CC) and a head number (HH). The combination of the cylinder number and the head number indicates the track address, commonly expressed in the form CCHH. The first record following the HA is commonly a track descriptor record, sometimes referred to as Record 0, or R0. The R0 record contains no key field, but may contain either system or user data. The first part of each user record is an "Address Marker" that enables the controller for the disk drive or disk drive subsystem to locate the beginning of the record when reading data.

Typically, the MVS host communicates with the disk drive controller or subsystem through an I/O channel to identify the device and track of interest, and to search for the desired record. The SEARCH parameter is typically a five byte field containing two bytes designating a cylinder number (CC), two bytes designating a head number (HH), and one byte designating the record number (R). Rather than tie up the I/O channel during the search process, the typical CKD data storage subsystem employs an electronic cache memory for providing a temporary storage of records that have been written by the host system, but not yet written to the disk by the controller. The cache memory may be a volatile memory which will be erased upon loss of power or a non-volatile memory which is less susceptible to data loss due to an interruption of power.

Figure 3:
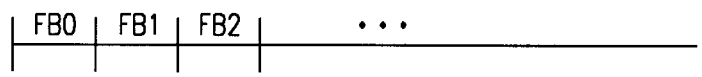
FIG. 3 is a representation of the FBA Data Format.

FIG. 3 illustrates a typical FBA track of a plurality of blocks. In FBA devices, the data is addressed according to the address of the physical block (often called "sector", which is not necessarily related to the pie-shaped sections of a physical disk). The blocks are arranged in linear sequence around the track and are addressed by means of a physical block number. The data record may therefore be addressed without the need for a physical search of the device to locate the record. The physical block numbers are also in linear sequence.

Host MVS data processing systems typically have large data sets and therefore typically utilize a volume table of contents (VTOC) for disk drive subsystems which provide a directory or table of contents relating to the data records stored in the subsystem. The VTOC may be provided for individual drives, all drives in the subsystem, or for all drives in a RAID subsystem (Redundant Array of Independent Drives) where data is distributed over a number of drives and does not reside on any individual drive, together with redundancies to allow rebuilding of data should one or more drives fail. Typically, the VTOC is created by the MVS host.

FIG. 1 illustrates one embodiment of a data storage subsystem 20 in accordance with the present invention. One or a a plurality of associated controllers 22 and 23, which may use the same multiprocessor or each may have one or more microprocessors, are associated with disk data storage devices 24 and 25. The disk data storage devices 24 and 25 may comprise separate individual disk drives, different disks on a single drive, or, in a preferred embodiment, they may comprise different sections of a RAID disk array.

The controllers 22 and 23 are connected to the MVS data processing system 10 and to the FBA-based data processing system 12 by interfaces 28. The interface and connection 30 to the MVS data processing system 10 may be a conventional high speed fiber optic serial (ESCON) interface. The interface and connection 31 to the FBA-based data processing system 12 may be a conventional high speed electronic parallel interface, such as SCSI. Data may also be transferred internally over a bus 35 between any interface and the controllers 22 and 23 and between the controllers.

The extracted data set must comply with preset rules. The first rule is that the extracted data set comprise "regular" records which are equal in length and are an even multiple of the length of the fixed blocks, for example, eight times the size of is the fixed blocks. If the fixed blocks are 512 bytes in length, the extracted data set records must be 4K in length (in binary terminology), an actual write length of 4096 bytes. Thus, if a record of the on line data set 11 being extracted is not 4K, additional zeros are written to the full data length.

Another rule is that the key length is set to 0. Thus, no keys are allowed.

CKD records of this format are common in the art and allow ease of access and ease of updating.

Figure 4:
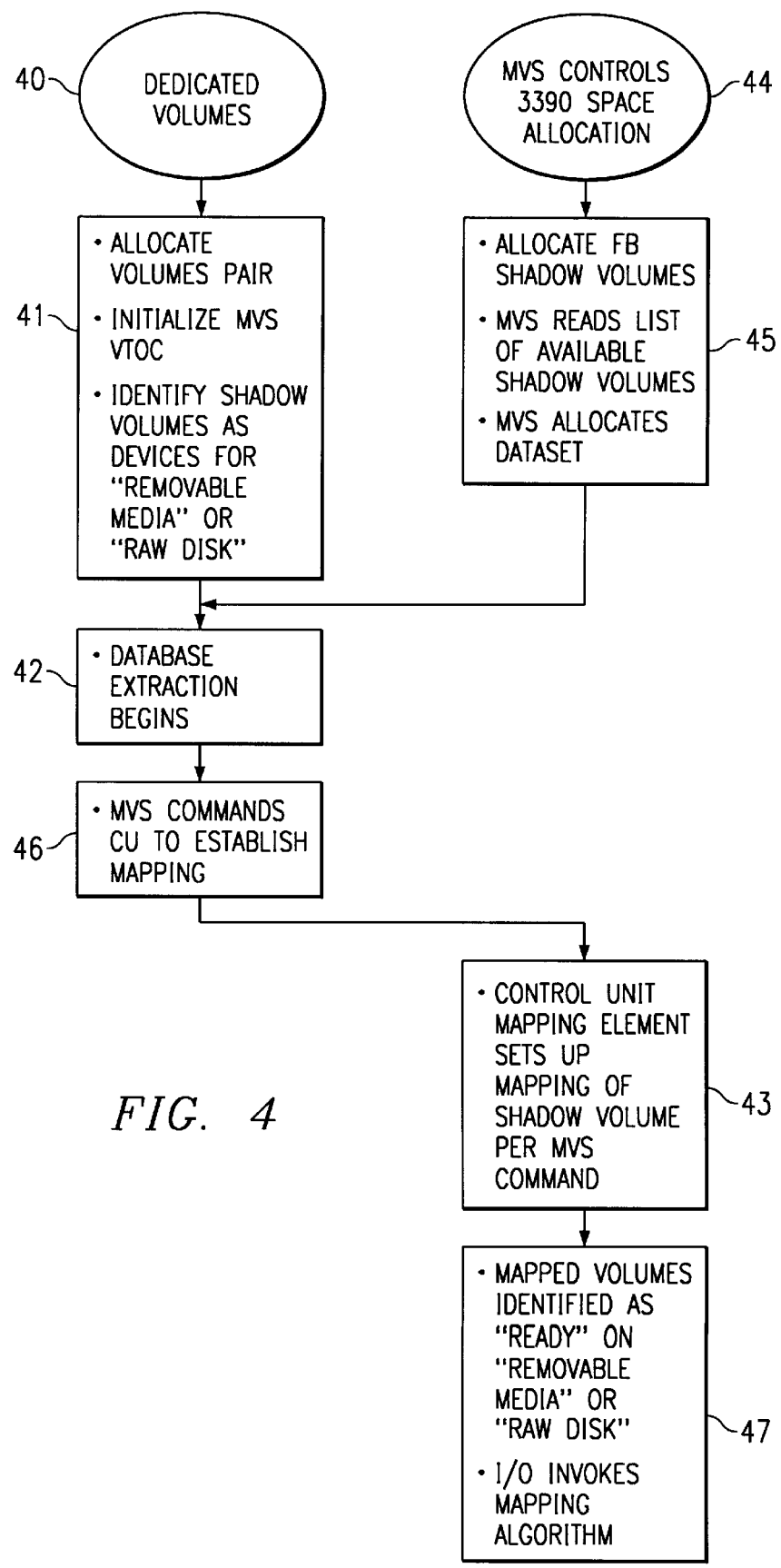
FIG. 4 is a flow diagram of the method of the present invention.

With reference to FIG. 4 and to FIG. 1, in accordance with an embodiment of the present invention, the data storage subsystem 20 is first configured in step 40, typically by an operator, to have CKD volumes, and "special" or "shadow" volumes that are stored as CKD volumes, but may be shared with an FBA-based data processing system 12. These CKD volumes are depicted as data storage 24. Additionally, other volumes may be configured as FBA volumes for access solely by the FBA-based data processing system. The FBA volumes are depicted as data storage 25.

The underlying storage of data storage 24, in the data storage subsystem 20, may comprise one or a plurality of disk drives arranged in a known configuration, ranging from disk drives in parallel to RAID. The formatting of the disk may be in CKD format or may be FBA disks which are arranged to emulate CKD data storage, and are configured as CKD and shadow volumes.

In step 41, the volumes are allocated to the respective hosts, and the shadow volumes may be allocated as a pair of volumes to each of the hosts. The VTOC for the MVS host is initialized, and the shadow volumes are identified as (1) "raw disk" space similar to FBA space in storage 25, or (2) as a "removable media" device such as a CD-ROM or DVD reader. The "removable media" device will initially appear to the FBA-based (e.g., AIX) host 12 as a device which is turned off or has no media loaded. The data flow of the method begins at step 45 upon or after the MVS data processing system 10 extracts the data set from on-line data base 11 to be analyzed or processed by the FBA-based data processing system 12. The extracted data set represents the status of the on line data base at a particular moment in time. The MVS data processing system 10 continues normal processing and, in so doing, will continue to alter the on line data base after the data set has been extracted. If desired to obtain a more up to date analysis after the basic analysis has been conducted, it may be necessary for the MVS data processing system to later update the extracted data set.

The data processing system 10 initiates the steps required to provide the extracted data set over connection 30 to the data storage subsystem 20. The received commands preceding the extracted data set are provided to controller 22. The controller gem 22 may include controls, a cache memory (which may be volatile), a non-volatile storage 32, and adapters for the data storage 24. Controller 22 may be a workstation microprocessor, such as an IBM RS/6000, as is typically used for data storage subsystems. In step 45, controller 22 allocates a shadow volume as a CKD volume in disk storage 24 which has been identified to controller 23 as an FBA volume in disk storage 24, thereby sharing the data. The MVS host names the CKD file and updates the VTOC for the data set and any extents, storing the updates in the VTOC area of disk data storage 24. The mapped FBA shadow volume, which is the shadow volume as it appears to the FBA controller 23, may be identified to the FBA controller 23 and to the AIX host 12, in step 41, as though it is configured as a volume on one of two types of devices as described above: (1) as a "raw disk", in which the data blocks will be treated as normal FBA space for both reading and writing by the AIX host, or (2) as a "removable media" having a preset directory, such as a read-only CD-ROM, or a read-only DVD disk. The appearance to an AIX host as a device having a preset directory simplifies and speeds the operation of the AIX host.

In step 42, the MVS host 10 extracts the data set and supplies the extracted data set to subsystem 20 for storage in the allocated CKD shadow volume.

In step 46, the MVS host 10 issues a command to subsystem 20 to map the extracted data set to be supplied. The command is issued to the unit address of the CKD volume and the parameters include the serial number of the configured "raw disk" or "removable media" device.

In step 43, the extracted data set is supplied to element 32 of controller 22 and is then stored in the allocated CKD shadow volume storage areas of disk data storage 24, and the mapping element establishes the mapping criteria for the shadow volume in response to the MVS command.

Thus, the extracted data set stored in the CKD disk data storage 24 may be associated with the results of the analysis by the FBA-based data processing system 12, or may be used for later updating of the extracted data set.

The data from the extracted data set of step 42 may alternatively be supplied by controller 22 to element 32 to be temporarily stored as a "shadow copy" and mapped in step 43, and subsequently stored in storage 24 for access by controller 23. The controller 23 may include controls, a cache memory (which may be volatile), element 33 also including a non-volatile storage, and adapters for the data storage 25. Controller 23 may be a workstation microprocessor, such as an IBM RS/6000, as is typically used for data storage subsystems. Controller 22 thus may store records of the shadow copy of the data set in the non-volatile store of element 32 and formats the extracted data set into fixed blocks, according to the above preset rules. Element 32 may include a program of controller 22 or a separate programmable read-only memory or a programmed logic array.

The typical FBA format is well known and comprises a series of fixed size blocks. In the example illustrated in FIG. 3, the blocks each contain 512 bytes of data. In an exemplary disk storage 25, a track may comprise 96 blocks of 512 bytes each, thereby containing 12 CKD records of 4K bytes each.

To provide access by the FBA controller 23 to the data records of the extracted data set, the mapping element of controller 22 includes a simple mapping algorithm. In alternative embodiments, one or both the controllers 22 and 23 may comprise the "mapping elements" to map the data of the shadow volume of the extracted data set to the FBA format of the storage controller 23.

Specifically, the algorithm translates the address of the first record (R1) of the extracted data set to the offset comprising the FBA address of the first fixed block of the allocated storage for controller 23. The data of the extracted data set is stored in step 43 in CKD storage 24. The FBA addresses are mapped to the FBA format, beginning at the offset location. The FBA address of each remaining fixed block of the data set is one additional increment to the previous FBA address. The mapping algorithm relates the extracted data set record 4K byte size in the 8 to 1 ratio of the fixed blocks, and relates the track contents of 12 CKD records for each FBA track in simple arithmetic.

Other arithmetic relationships may also be used in accordance with the present invention.

The mapping element of controller 22, in accordance with the mapping, initiates the appropriate AIX directory for the mapped fixed blocks in the desired format for access by AIX host 12 via controller 23.

Upon completion of the mapping of the extracted data set, the subsystem, in step 47, identifies the mapped volume as "Ready" at interface 28 for the FBA data processing system 12. The "Ready" identification may comprise setting a SCSI "Unit Attention" which may be queried by the FBA data processing system. The identification preferably identifies the mapped volume as "Removable Media" which appears as though the media has just been loaded and has been spun up, or alternatively as "Raw Disk". The FBA data processing system then employs controller 23 for directly accessing the FBA data on disk data storage 24 for analysis by FBA data processing system 12. The data set thus remains under the control of the CKD controller 22, but is accessed and shared by the FBA controller 23.

Each I/O of the FBA data processing system 12 with respect to the shadow volume invokes the mapping that was set up in step 43. The mapping algorithm and directory are thus applied to each I/O to allow the FBA data processing system to access the data through controller 23.

In the implementation for data mining of a data set extracted from an on line data base of MVS data processing system 10, it is desirable that the data mining processor not alter the received data. Therefore, the data processing system 12 which employs FBA data is limited to read-only access to the data records on disk data storage 24.

The access by data processing system 12 is the normal high speed direct access that the data processing system has to all disk data storage, which direct access is very secure and unlikely to have errors.

In addition, the data within the records is stored in the common shadow volume. Thus, this has the same effect as though the data has been transferred without the error prone translation commonly encountered in the conventional format change from CKD to FBA from an MVS host to an AIX host.

Should any updating be required, MVS data processing system 10 may provide any updates to controller 22. The controller 22 consults the VTOC in disk data storage 24 and updates the shadow volume records on disk data storage 24. In the mapped arrangement, either the entire data set on disk data storage 24, or the updated records of the data set may be updated. To provide subsequent access by the FBA data processing system (AIX host) 12 to the updated shadow volume, the mapped addresses of the records are provided to controller 23 for accessing the fixed blocks of the shadow volume on disk data storage 24. The updates are conducted an entire record at a time, maintaining the simplicity of the system.

An alternative embodiment of the invention also illustrated by step 45 allocates data extents to the MVS data processing system, and the allocated data extents are stored as data blocks. The MVS data processing system provides the list of extents, each extent including a conventional series of contiguous tracks and cylinders. The provision of extents is described, for example, in co-assigned U.S. Pat. No. 5,499,354. The MVS host generates the VTOC relating the data set to the physical extents of the allocated list for storage in data storage 24. The CKD shadow volume is thus stored as a series of extents. The mapping algorithm is employed as before in steps 42, 46 and 43 to map the shadow volume to the FBA controller 23.

Figure 5:
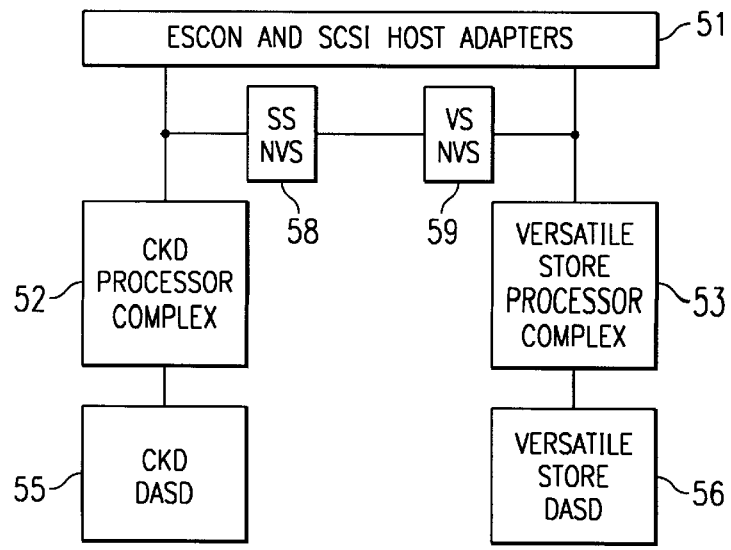
FIG. 5 is a diagrammatic representation of an alternative embodiment of the data storage subsystem of the present invention.

FIG. 5 illustrates an alternative embodiment of the shared direct access data storage subsystem of the present invention for sharing data from an MVS data processor and a data processor employing FBA data. The data storage subsystem includes a plurality of host adapter interfaces 51 of the two different types. One type of host adapter connects to MVS hosts, for example, with fiber optic connections such as ESCON, and the other type of host adapter connects to hosts which employ FBA data, for example, with a SCSI interface.

The disk data storage systems may comprise clusters of processors 52 and 53 and of disk storage devices, or DASD 55 and 56. The clusters may be RAID subsystems which store data distributed across a number of disk drives and have sufficient redundancies that data is not likely to be lost at any time.

In the embodiment of FIG. 5, two additional processors 58 and 59 are provided. Processor 58 provides a non-volatile storage for temporarily storing data and a microprocessor to manage the storage so as to be secure, called "Secure Storage Non-volatile Store" or SS NVS. Processor 58 calculates the VTOC for the extracted data set stored in the shadow volume from the MVS host and stores the shadow volume in the storage subsystem 52 and 55. Thus, the data set remains accessible by, and under the control of, the MVS processor.

Processor 59 provides a non-volatile storage for temporarily storing data for access by an FBA processor in "Versatile Store" storage 53 and 56, employing normal FBA linear formatting.

The mapping element of the processor 58 provides a mapping algorithm for allowing access to the shadow volume by processor 59 in FBA format.

In the embodiment of FIG. 5, the SS NVS 58 and the VS NVS 59 are connected to both host adapters for simultaneously storing data and giving an instantaneous backup to any received data. Thus, the CKD data storage of the shadow volume by processor 58 and the access to the shadow volume by the processor 59 may be conducted concurrently.

While the preferred embodiments of the present invention have been illustrated in detail, it should be apparent that modifications and adaptations to those embodiments may occur to one skilled in the art without departing from the scope of the present invention as set forth in the following claims.

I claim:

1. A shared direct access storage subsystem for use with both a count-key-data (CKD) data processing system and a data processing system employing fixed block architecture (FBA) data, for storing records of a data set received from said CKD data processing system at an input, comprising;

an FBA controller element for accessing FBA data records as fixed blocks in linear sequences in an FBA format, having block linear sequence numbers for direct access by said FBA data processing system;

a CKD controller element and disk data storage responsive to said input for receiving said records of said data set from said CKD data processing system and storing said data set records in CKD format within a "shadow volume", under preset rules compatible with both said CKD format and said FBA format, and retaining said CKD format for access by said CKD controller element;

a mapping element responsive to said input for receiving said data set records, for mapping said CKD formatted data set records from said CKD data processing system, of said "shadow volume", into FBA data records in said FBA format with fixed blocks, each FBA data record arranged in a linear sequence of said fixed blocks, and for providing access to said mapped CKD data set records by said FBA controller for direct access by said data processing system employing FBA data; and a direct access storage interface between said FBA controller and said FBA data processing system identifying said data set to said FBA data processing system as though said data set is a "removable media" having a preset directory, and employing FBA data for direct read only acces to said formatted records.

2. A shared direct access storage subsystem for use with both a count-key-data (CKD) data processing system and a data processing system employing fixed block architecture (FBA) data, for storing records of a data set received from said CKD data processing system at an input, comprising:

an FBA controller element for accessing FBA data records as fixed blocks in linear sequences in an FBA format, having block linear sequence numbers for direct access by said FBA data processing system;

a CKD controller element and disk data storage responsive to said input for receiving said records of said data set from said CKD data processing system and storing said data set records in CKD format within a "shadow volume", under preset rules compatible with both said CKD format and said FBA format, and retaining said CKD format for access by said CKD controller element; and a mapping element responsive to said input for receiving said data set records, for mapping said CKD formatted data set records from said CKD data processing system, of said "shadow volume", into FBA data records in said FBA format with fixed blocks, each FBA data record arranged in a linear sequence of said fixed blocks, and for providing access to said mapped CKD data set records by said FBA controller for direct access by said data processing system employing FBA data; wherein said records of said received data set include CKD track id and record number and said records are uniformly sized, and wherein said mapping element additionally:

converts said uniformly sized records into smaller sized fixed blocks, the size of said uniformly sized records being an even multiple of said smaller sized fixed blocks;

maps the first record of said data set into the block id of the first block of said sequence of fixed blocks; and provides a mapping algorithm for translating said uniformly sized record track id's and record numbers into said FBA block linear sequence numbers.

3. Method for sharing an extracted data set of a count-key-data (CKD) data processing system with a data processing system employing fixed block architecture (FBA) data, said data set comprising a plurality of records, comprising the steps of:

receiving said extracted data set records from said CKD data processing system;

storing said extracted data set records in CKD format within a "shadow volume" in CKD storage, under preset rules compatible with both said CKD format and said FBA format, and retaining said CKD format for CKD access;

mapping said extracted CKD formatted data set records of said "shadow volume" into FBA data records in said FBA format with fixed blocks, each FBA data record of said extracted data set arranged in a sequence of fixed blocks, each having a block id, said block id comprising a linear sequence number; and providing read only direct access to said stored extracted CKD data set in said FBA format by said FBA data processing system, and identifying said data set to said FBA data processing system as though said data set is a "removable media" having a preset directory and providing said read only direct access at a storage interface of said FBA data processing system.

4. Method for sharing an extracted data set of a count-key-data (CKD) data processing system with a data processing system employing fixed block architecture (FBA) data, said data set comprising a plurality of records, comprising the steps of:

receiving said extracted data set records from said CKD data processing system;

storing said extracted data set records in CKD format within a "shadow volume" in CKD storage, under preset rules compatible with both said CKD format and said FBA format, and retaining said CKD format for CKD access;

mapping said extracted CKD formatted data set records of said "shadow volume" into FBA data records in said FBA format with fixed blocks, each FBA data record of said extracted data set arranged in a sequence of fixed blocks, each having a block id, said block id comprising a linear sequence number; and providing direct access to said stored extracted CKD data set in said FBA format by said FBA data processing system;

wherein each record of said extracted data set includes CKD track id and record number and said records are uniformly sized, and said step of mapping comprises the steps of:

converting said uniformly sized records into smaller sized fixed blocks, the size of said uniformly sized records being an even multiple of said smaller sized fixed blocks;

mapping the first record of said data set into the block id of the first block of said sequence of fixed blocks; and providing a mapping algorithm for translating said uniformly sized record track id's and record numbers into said block id's.

5. The method for sharing a data set of claim 4, additionally comprising the step of:

accessing said extracted data set in said FBA storage with said CKD data processing system using said map and said mapping algorithm.

6. The method for sharing a data set of claim 5, wherein said step of accessing said extracted data set with said CKD data processing system additionally comprises updating said extracted data set.

* * * * *